United States Patent [19]

Clark

[11] 3,976,918

[45] Aug. 24, 1976

[54] FALSE TRIGGERING PROTECTION FOR GROUND FAULT SENSOR

[75] Inventor: William R. Clark, Bedford, Mass.

[73] Assignee: I-T-E Imperial Corporation, Spring House, Pa.

[22] Filed: Oct. 4, 1974

[21] Appl. No.: 512,211

[52] U.S. Cl. .................................. 317/18 D; 317/49
[51] Int. Cl.² ............................................ H02H 3/28
[58] Field of Search ............... 317/18 D, 49, 33 SC, 317/33 VR, 33 R; 323/88, 60, 48, 6; 340/199, 253 N; 324/51

[56] References Cited
UNITED STATES PATENTS

| | | | |
|---|---|---|---|
| 3,555,360 | 1/1971 | Lee | 317/18 D |
| 3,633,070 | 1/1972 | Vassos et al. | 317/49 X |
| 3,769,548 | 10/1973 | Pardue | 317/33 SC X |
| 3,852,642 | 12/1974 | Engel et al. | 317/18 D |

Primary Examiner—J D Miller
Assistant Examiner—Patrick R. Salce
Attorney, Agent, or Firm—Ostrolenk, Faber, Gerb & Soffen

[57] ABSTRACT

A ground fault detector-interrupter, including a differential transformer for detecting the difference between currents in the hot and neutral conductors connecting a load to an a.c. source, is provided with a resistor shunting the differential transformer primary winding in series with the hot conductor. By shunting part of the current in the hot primary around the differential transformer, the transformer is effectively desensitized under high in-rush current conditions to protect against false triggering that would normally be caused by non-uniformity in the transformer windings and/or less than precise placement of transformer leads.

7 Claims, 1 Drawing Figure

U.S. Patent  Aug. 24, 1976  3,976,918
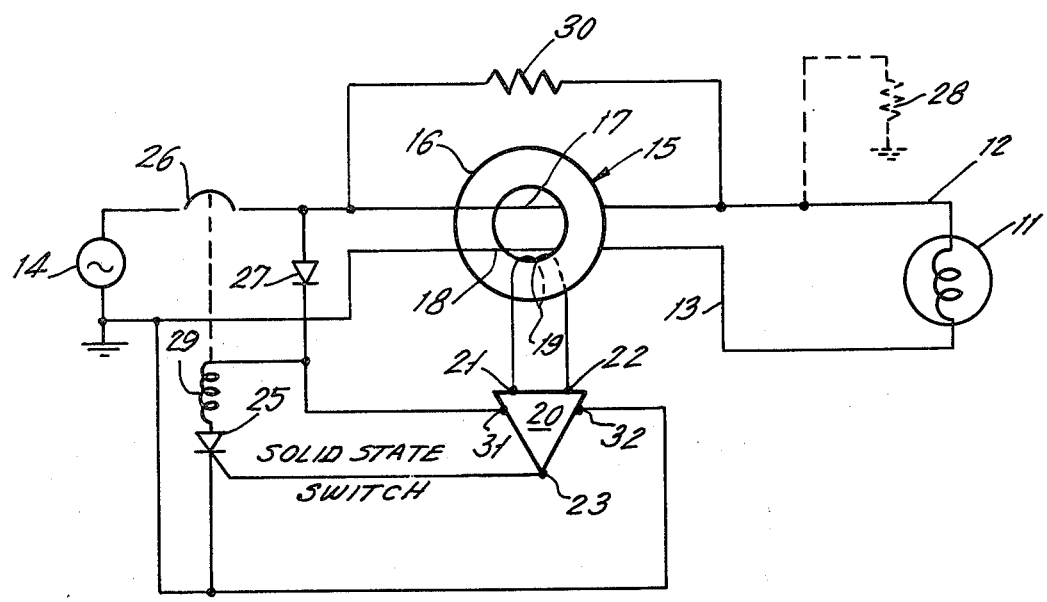

FALSE TRIGGERING PROTECTION FOR GROUND FAULT SENSOR

This invention relates to ground fault interrupters in general, and more particularly relates to interrupters of this type having means to reduce incidence of false tripping.

It has become increasingly popular to utilize a differential transformer as the fault sensing means in a ground fault detector-interrupter. Devices of this type that are constructed so as to trip at relatively low values of ground fault current, say 5 milliamperes, are often subject to false tripping because of non-uniformity in the transformer. Thus, in the prior art, the differential transformer was required to be a precision device with windings constructed to very close tolerances and the placement of leads was extremely critical.

False triggering was particularly troublesome in the case of loads demanding high in-rush currents. A typical load of this type is a tungsten lamp which requires an in-rush current of approximately ten times normal or running current. Because of non-uniformity in prior art differential transformers, this high in-rush current would often generate a net flux in the transformer core of the same phase as flux generated by a ground fault. In the case of a ground fault having a magnitude below the triggering level, the load current net flux, if in phase with the ground fault flux, would combine therewith to cause false triggering.

The instant invention alleviates the false triggering problem referred to above by utilizing a shunt or bypass resistor paralleling the transformer primary winding in series with the hot lead. The presence of this resistor temporarily desensitizes a ground fault sensor when operating at large in-rush currents, yet has an effect that is negligible at normal load currents. For example, the bypass resistor may be proportioned so that during the relatively short period of high in-rush currents of a value ten times that of a normal 20 ampere load, desensitizing will be in the order of 2 milliamps, which is significant. However, during normal load current the current bypass or desensitizing is in the order of 0.2 milliamperes, which is minor in a system set to trip at 5 milliamps of ground fault current.

Accordingly, a primary object of the instant invention is to provide novel means for preventing fault triggering of ground fault current interrupters.

Another object is to provide means of this type that is simple, inexpensive, and effective.

Still another object is to provide means of this type that desensitizes the sensing means, with desensitizing increasing as load current increases so as to be especially effective during high in-rush load currents.

These objects as well as other objects of this invention shall become readily apparent after reading the following description of the accompanying drawing in which the single FIGURE is a schematic of a ground fault sensor-interrupter connecting a load to an a.c. source, and including means constructed in accordance with the instant invention for preventing false triggering.

Now referring to the FIGURE. Tungsten lamp load 11 is connected by hot lead 12 and neutral lead 13 to energizing a.c. source 14. Neutral 13 is grounded near source 14. Leads 12 and 13 both extend through toroidal core 16 of differential transformer 15 and provide single turn primary windings 17, 18, respectively, for transformer 15. The latter also includes multi-turn secondary winding 19 connected to input terminals 21, 22 of solid-state operational amplifier 20. Output terminal 23 of amplifier 20 is connected to the control electrode of solid-state switch 25 which brings about opening of circuit interrupter 26 by actuation of solenoid 29, when the output of amplifier 20 is of sufficient magnitude to trigger switch 25. Resistor 30 is connected in electrical parallel with primary 17 and is positioned outside of core 16 so that current shunted through resistor does not generate flux in core 16.

Diode 27 is connected between hot lead 12 and ungrounded energizing terminal 31 of amplifier 20 whose other energizing terminal 32 is grounded. Diode 27 is also connected to ground through solenoid 29 and the power circuit of solid-state switch 25. Thus, diode 27 provides positive half cycle power to solenoid 29 and amplifier 20. Resistor 28 represents a leakage path between hot line 12 and ground.

Ground fault currents caused by leakage path 28 will flow through lead 12 and will produce a voltage in secondary winding 19 which will be amplified by amplifier 20. As the leakage current increases, output 23 will increase until solid-state switch 25 is triggered, energizing coil 29 to open circuit interrupter 26.

Differential transformer 15 is so constructed that load current flow through primary windings 17, 18 is intended to produce equal but opposite fluxes in core 16 so that the net effect of these fluxes will be zero and no voltage will be induced in secondary winding 19. Slight imbalance between windings 17, 18 and/or non-precision placement of leads for transformer 15 may be compensated for to a degree by a calibrating element (not shown) in amplifier 20. However, during high in-rush load currents which flow when load 11 is initially energized, a signal of significant magnitude may be induced in secondary winding 19 by the load current. If this in-rush load current signal is induced in secondary winding 19 at a time when there is a ground fault insufficient by itself to cause tripping, the load current and ground fault current signals induced in secondary winding 19 may, in the absence of resistor 30, combine and results in the application of a signal at amplifier input 21, 22 sufficient in magnitude and/or character to operate switch 25 and open interrupter 26. Thus, even though the ground fault current was not of a dangerous magnitude, the circuit was automatically deenergized.

Since diode 27 provides power only during the positive half cycles of supply 14, amplifier 20 will be active only during those times. Thus, amplifier 20 operates as a polarity sensitive device. Transformer 16 and amplifier 20 are connected such that the signal at output terminal 23 indicates that a fault imbalance condition exists where more current is going toward the load 11 than toward the source 14 during that particular half cycle. If a current is caused to flow toward the source, then that much more current will be required to flow toward the load to achieve the same fault indication at output terminal 23 and the ground fault sensor is desensitized by the amount of current flowing toward the source. Resistor 30 allows a portion of the load current to bypass the transformer 15 as the load current flows toward the load on conductor 12. All current returning to the source through conductor 13 will flow through transformer 15. Therefore, transformer 15 will see more current flowing toward the source, and the amount of the current imbalance will depend on the load current.

If resistor 30 and primary 17 are so proportioned that resistor 30 carries one thousandth of one percent of the current in hot lead 12, for a condition in which load 11 normally draws 20 amperes, the current bypassing primary 17 will be 0.2 m.a. This bypass current is very minor in a system set to trip with ground fault current of 5.0 m.a. However, when load 11 is energized, the in-rush current is approximately 200 amperes, so that 2.0 m.a. bypasses primary 17. This in-rush bypass current is very significant, serving to substantially desensitize transformer 15, thereby preventing false triggering.

Placement of resistor 30 in parallel with primary winding 17 shunts a portion of the current in hot lead 12 away from primary winding 17 and effectively desensitizes differential transformer 15. Thus, it is seen that by utilizing a simple lumped resistor in parallel with the primary winding in the hot line, false triggering during high in-rush current is prevented. The value of the bypass current is preferably in the range of from one to two thousandth of one percent of load current.

Although in the foregoing this invention has been described in connection with preferred embodiments, many variations and modifications will now become apparent to those skilled in the art, and it is therefore preferred that this invention be limited not by the foregoing description but only by the appended claims.

The embodiments of the invention in which an exclusive privilege or property is claimed are defined as follows:

1. Circuit protective means including differential transformer means having first and second primary windings in series with the respective hot and neutral conductors connecting a load to an alternating current source of electrical energy and a secondary winding wherein signals related to differential currents in said primary windings are induced; circuit interrupting means in series with said hot conductor; solid state switching means connected to said interrupting means for actuating the latter to open said hot conductor; a polarity sensitive amplifier operative only when a current flows through said first primary winding toward said load, said polarity sensitive amplifier having an input to which said signals induced in said secondary winding are applied and having an output directly connected to said solid state switching means for controlling actuation of said interrupting means when said signals are of predetermined characteristics; and impedance means in electrical parallel connection across only said first primary winding to divert a portion of load current from flowing through only said first primary winding thereby to intentionally unbalance the current flow in said first and second primary windings in a direction to always desensitize said circuit protective means by the amount of current diverted by said impedance means at least during periods of high inrush currents to the load.

2. Circuit protective means as set forth in claim 1 in which the impedance means includes a lumped resistor.

3. Circuit protective means as set forth in claim 1 in which the impedance means carries approximately 0.001 to 0.002 percent of total load current.

4. Circuit protective means as set forth in claim 1 in which the transformer means includes a core to which said secondary and both of said primary windings are magnetically coupled; said impedance means being magnetically decoupled from said core.

5. Circuit protective means as set forth in claim 4 in which the impedance means includes a lumped resistor.

6. Circuit protective means as set forth in claim 5 in which the core is in the form of a loop through which said secondary and both said primary windings pass, and said lumped resistor is operatively positioned outside of said loop.

7. Circuit protective means as set forth in claim 6 in which the impedance means carries approximately 0.001 to 0.002 percent of total load current.

* * * * *